United States Patent

Size

[15] 3,640,208
[45] Feb. 8, 1972

[54] IMMERSION DEEP FRIER

[72] Inventor: Robert A. Size, 1250 West 130th, Gardena, Calif. 90247

[22] Filed: Aug. 4, 1969

[21] Appl. No.: 847,041

[52] U.S. Cl. .................................................. 99/408, 99/403
[51] Int. Cl. ............................................................. A47j 37/12
[58] Field of Search .................................. 99/408, 403–404, 99/405–406, 407, 444, 446, 326; 126/391, 360; 210/162, 167, 171

[56] References Cited

UNITED STATES PATENTS

| | | | |
|---|---|---|---|
| 2,041,175 | 5/1936 | Goodman | 99/405 |
| 2,305,039 | 12/1942 | Stead | 99/408 |
| 2,429,360 | 10/1947 | Kells | 99/408 UX |
| 2,552,621 | 5/1951 | Clay | 99/404 |
| 2,655,144 | 10/1953 | Keating | 126/391 |
| 3,210,193 | 10/1965 | Martin | 99/403 UX |
| 3,326,692 | 6/1967 | Martino et al. | 99/326 |

FOREIGN PATENTS OR APPLICATIONS

| | | | |
|---|---|---|---|
| 168,509 | 9/1921 | Great Britain | 126/391 |

*Primary Examiner*—William I. Price
*Assistant Examiner*—Arthur O. Henderson
*Attorney*—Fulwider, Patton, Rieber, Lee & Utecht

[57] ABSTRACT

An immersion deep frier including a tank filled to a selected level with shortening and having a plurality of coextensive open-ended heating tubes disposed below such level. Alternate ones of the heating tubes are angled upwardly in one direction and the remaining tubes are angled upwardly in the opposite direction. Burners are disposed at the lower ends of each of the tubes and a blower is provided for forcing air upwardly through the tubes whereby the shortening at the lower ends of the tubes will be heated and caused to expand thereby moving inwardly along the respective tubes to approximately the center of the tank where it will encounter currents moving along the adjacent oppositely angled tubes and will rise upwardly and be turned outwardly to travel to the outer periphery of the tank where it will turn downwardly and inwardly to again commence travel inwardly along the respective tubes thereby providing a number of small currents circulating in the tank to prevent burning of the shortening and provide uniform agitation and circulation of foodstuffs disposed in the tank.

7 Claims, 7 Drawing Figures

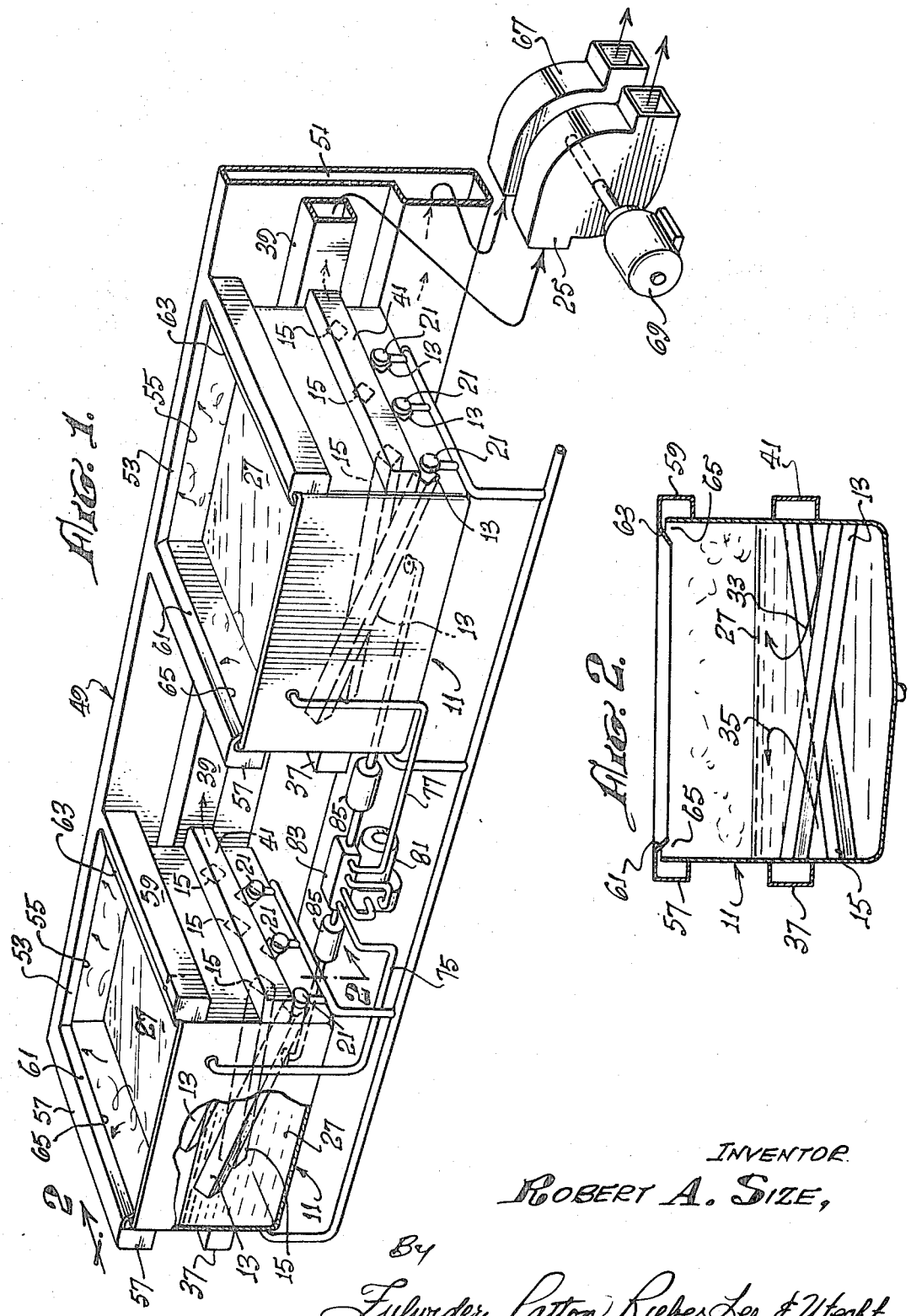

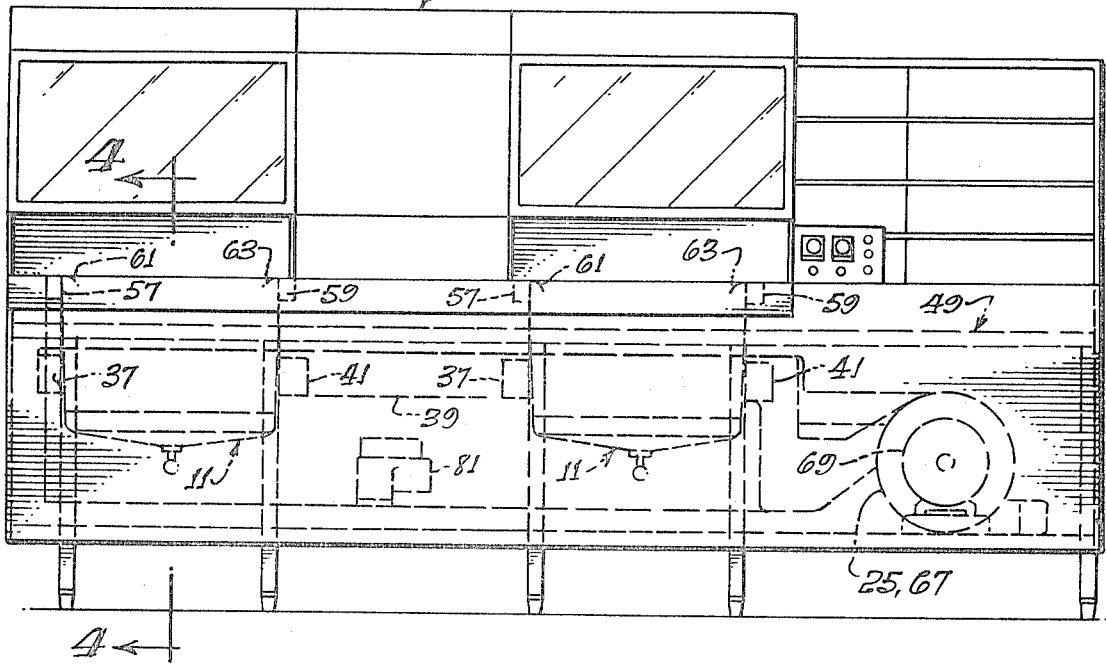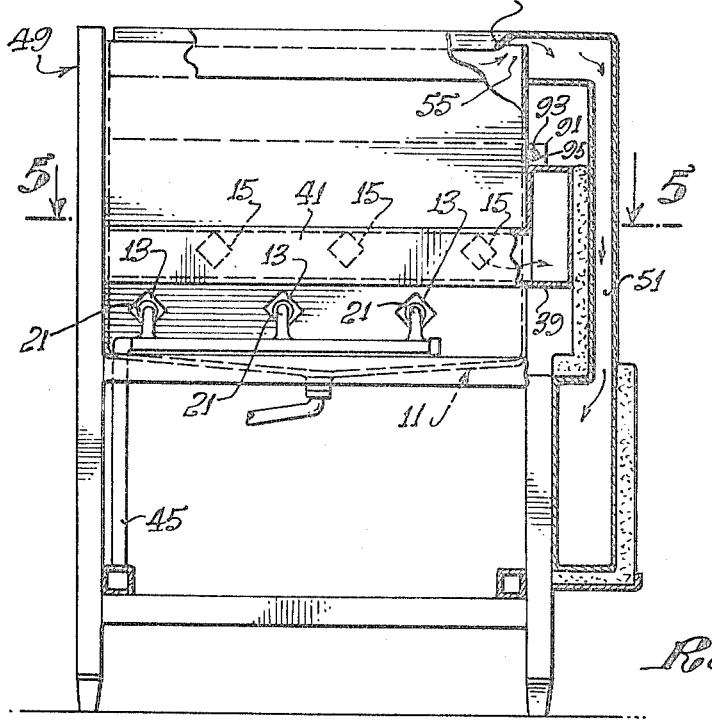

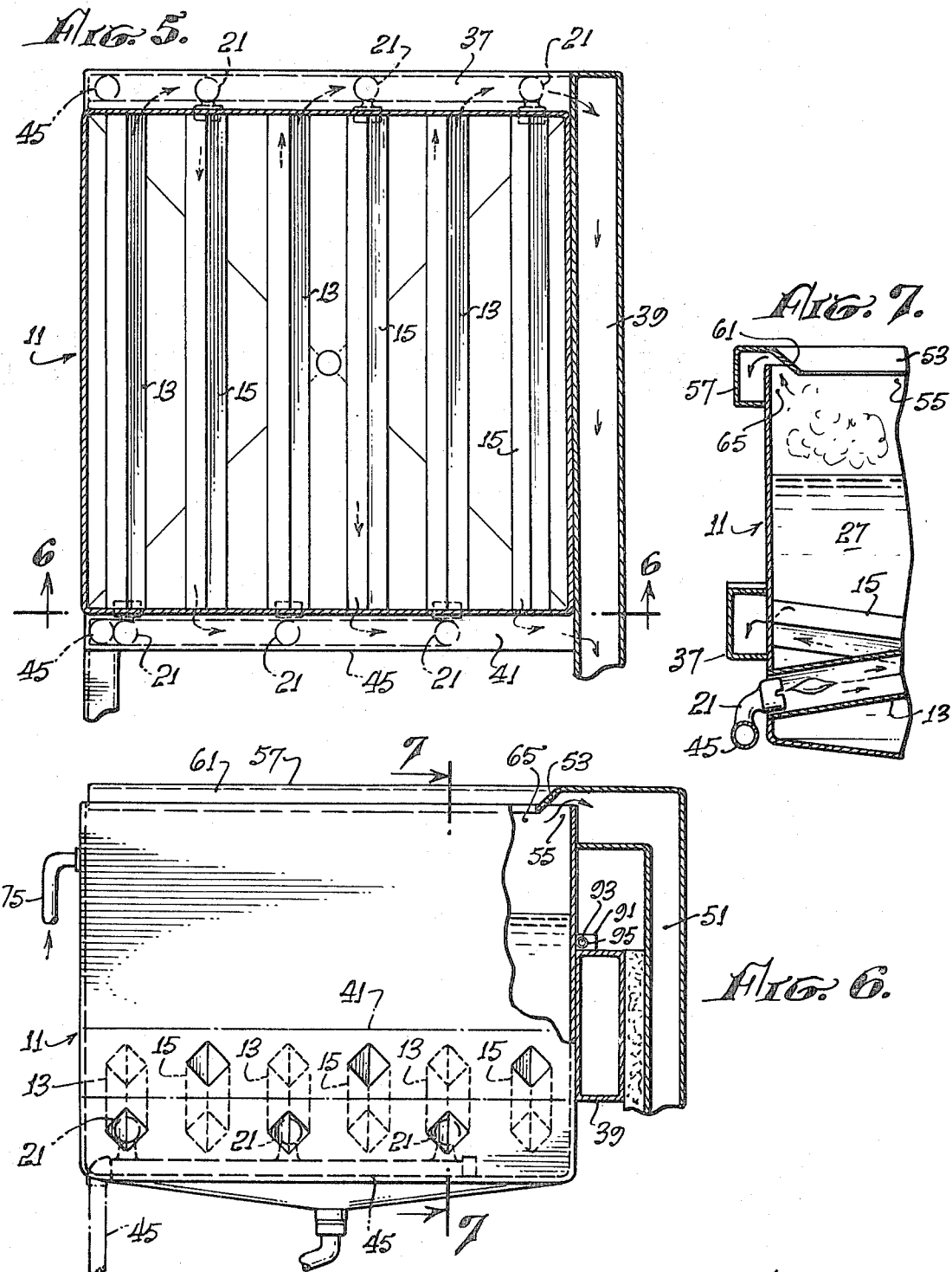

IMMERSION DEEP FRIER

BACKGROUND OF THE INVENTION

1. Field of the Invention

The present invention relates to immersion deep friers.

2. Description of the Prior Art

There are no deep friers known to applicant which include a plurality of coextensive heating tubes disposed in a shortening tank and wherein alternate ones of the tubes angle upwardly in one direction and the remaining tubes angle upwardly in the opposite direction to thereby induce opposing currents of heated shortening when the tubes are heated.

SUMMARY OF THE INVENTION

The present invention is characterized by a deep frier including a first set of heating tubes immersed in a shortening tank and angled upwardly in one direction, and a second set of heating tubes immersed in such tank and interposed between pairs of tubes of the first set and angled upwardly in the opposite direction. Burners are provided at the lower ends of each of the heating tubes and air is forced through such tubes from said lower ends to cause the shortening proximate the lower ends of the respective tubes to be heated and travel upwardly along the tube to the central portion of the tank where it will encounter opposing currents produced by the adjacent oppositely angled tubes and, such encounter, along with the heat induced expansion, will force the currents upwardly and direct them back outwardly to the periphery of the tank where the respective currents will turn downwardly and inwardly to again commence travel inwardly along the respective tubes.

An object of the present invention is to provide a deep frier which causes the shortening to circulate in a plurality of relatively small and uniform currents to thereby provide relatively uniform agitation and temperatures throughout the tank.

Another object of the present invention is to provide a deep frier of the type described wherein the shortening fumes are drawn off from the tank and exhausted independently of the burner exhaust to reduce the fire danger.

These and other objects and the advantages of the present invention will become apparent from a consideration of the following detailed description when taken in conjunction with the accompanying drawings.

DESCRIPTION OF THE DRAWINGS

FIG. 1 is a broken perspective view of a deep frier embodying the present invention;

FIG. 2 is a vertical sectional view taken along the line 2—2 of FIG. 1;

FIG. 3 is a front view, in reduced scale, of the deep frier shown in FIG. 1;

FIG. 4 is a vertical sectional view, in enlarged scale, taken along the line 4—4 of FIG. 3;

FIG. 5 is a horizontal sectional view, in enlarged scale, taken along the line 5—5 of FIG. 4;

FIG. 6 is a vertical sectional view taken along the line 6—6 of FIG. 5; and

FIG. 7 is a vertical sectional view taken along the line 7—7 of FIG. 6.

DESCRIPTION OF THE PREFERRED EMBODIMENT

Referring to FIG. 1, the immersion deep frier of present invention includes a pair of tanks 11, each having first and second sets of open-ended heating tubes 13 and 15 disposed therein, the tubes 13 being angled upwardly to the left and the tubes 15 being angled upwardly to the right. Confronting the lower ends of each of the tubes 13 and 15 are respective gas burners 21 and a blower 25 is provided for drawing air in past the respective burners 21 to force heat the tubes and, consequently, the shortening 27 in the tanks 11. Thus, the shortening 27 proximate the lower ends of each of the respective tubes 13 and 15 will be heated and will tend to rise upwardly and will be forced inwardly along the respective tubes by the cool shortening sinking downwardly around the periphery of the tanks 11 to thereby define a plurality of oppositely circulating currents 33 and 35 (FIG. 2) corresponding with the number of tubes 13 and 15. The inwardly moving currents 33 and 35 will encounter one another near the center of the tanks 11 and, such encounter, along with the heat inspired expansion thereof, will cause the currents 33 and 35 to turn upwardly at the center of the tanks 11 and be directed outwardly to the periphery of the respective tanks 11 where they will turn downwardly and inwardly to again travel upwardly and inwardly along the respective tubes 13 and 15.

The upper, or exhaust, ends of the tubes 13 are covered by manifolds 37 which lead rearwardly to a collector 39 and the exhaust ends of the tubes 15 are covered by manifolds 41 which also lead rearwardly to the collector 39, the collector 39 having air drawn therethrough by means of the blower 25.

Still referring to FIG. 1, fuel is supplied to the burners 21 by means of tubing 45 which branches off to the individual burners.

As best seen in FIG. 1, the tanks 11 are supported from a cabinet, generally designated 49, which has a hollow backwall which forms an exhaust duct 51 for drawing fumes from above the shortening 27. The fumes duct 51 is formed with overhangs 53 (FIG. 6) which project forwardly over the back walls of the respective tanks 11 and cooperate therewith to define respective fumes inlets 55. A pair of conduits 57 and 59 extend forwardly along opposite sides of the tanks 11 and include respective overhangs 61 and 63 which project inwardly over the respective sidewalls of the tanks 11 and cooperate therewith to define elongated fumes inlets 65 (FIG. 7). A blower 67 is connected with the fumes duct 51 and draws the fumes therefrom for exhaust independently of the heat exhaust from the blower 25. The blowers 25 and 67 are conveniently driven by a common drive shaft connected with an electric motor 69.

A pair of circulation tubes 75 and 77 are connected with each of the tanks 11 and with a pump 81, to which flow is controlled by a valve unit 83 for selectively switching the pump between the two tanks at predetermined intervals. In series with the pump 81 is a filter 85 for filtering the shortening during such circulation.

Referring to FIG. 6, a housing 91 is supported on the back side of the tanks 11 for mounting a temperature sensing bulb 93. The housing includes an elongated semicircular cutout 95 for receiving the bulb 93, such cutout being open on the side confronting the tank 11. Thus, the bulb 93 is mounted in effective heat exchange relationship with the shortening 27 for sensing temperature of the shortening 27 without submersion of a sensing bulb therein.

In operation, fuel is provided to the burners 21 and such burners are ignited. The motor 69 is actuated to power the blowers 25 and 67 to thereby provide forced heating of the heating tubes 13 and 15 and to also provide for exhausting the fumes from above the shortening 27. The shortening at the vertical walls of the tank 11 will be relatively cool and that adjacent the respective tubes 13 and 15 will be heated to cause it to move upwardly and inwardly along the respective tubes as heating and expansion thereof causes it to rise. When the shortening traveling along the respective tubes approaches the central portion of the tanks 11, it will encounter oppositely moving currents from the oppositely slanted tubes 13 or 15 and will be directed upwardly as a consequence of such encounter, coupled with the relatively hot temperature and consequent thermal expansion taking place near the center of the tanks 11. The upwardly moving shortening will then turn and travel outwardly and will cool thus causing it to turn downwardly at the outer peripheries of the tanks 11 to thereby again be heated by the respective tubes 13 and 15 to again commence travel upwardly and inwardly along the respective tubes. Thus, the foodstuffs placed in the tank 11 will be agitated and heated uniformly by the relatively small eddy currents 33 and 35 which provide for uniform temperature control and for constant circulation to avoid burning and drying of the shortening on the respective heating tubes 13 and 15.

The control 83 for the circulation pump 81 is actuated to commence pumping and cause alternate cycling between the tanks 11 whereby the shortening in such tanks will be periodically cycled through the filter 85 to provide for filtration to maintain the shortening clean and clear.

From the foregoing, it will be apparent that the deep frier of present invention provides for agitation of the shortening to ensure uniform and thorough frying of the foodstuffs deposited therein and to avoid drying and burning of the shortening on the heating elements. Further, the separate blowers for the heating tubes and the fumes duct enable the air-fuel ratio to be controlled precisely and avoids the danger and smoke normally associated with combining the heat exhaust with the fumes exhaust.

Various modifications and changes may be made with regard to the foregoing detailed description without departing from the spirit of the invention.

I claim:

1. An immersion deep frier comprising:
    a first tank for being filled to a selected level with shortening;
    first and second sets of coextensive open-ended heating tubes disposed below said level and extending from one side to the other of said tank, said first set of tubes being angled upwardly in one direction to terminate at their upper ends in a first set of exhaust ports and the tubes of said second set being interposed between pairs of tubes of said first set and being angled upwardly in the opposite direction to terminate at their upper ends in a second set of exhaust ports;
    first and second manifold means disposed on opposite sides of said tank and connected with said respective first and second sets of exhaust ports for drawing exhaust fumes therefrom;
    heating means for heating air flowing into the lower ends of said tubes; and
    blower means connected with said manifold means for circulating heated air in through the lower ends of said tubes to force heat said tubes whereby said tank may be filled to said selected level with shortening and said heating and blower means actuated to force heat said tubes and cause said shortening to circulate upwardly and inwardly along tubes of the first set which will cause it to move inwardly along each tube of such first set to the central portion thereof where it will engage shortening moving upwardly along tubes of the second set and will be turned upwardly and be directed back outwardly to the periphery of the tank where said shortening will turn downwardly and be directed inwardly along each of said tubes again.

2. An immersion deep frier as set forth in claim 1 wherein:
    said heating means includes individual burners disposed at the entrance to said heating tubes.

3. An immersion deep frier as set forth in claim 1 that includes:
    a fumes duct formed with an inlet disposed in the upper portion of said tank; and
    means for drawing the shortening vapor from said first tank.

4. An immersion deep frier as set forth in claim 1 that includes:
    a second tank for being filled to a selected level with shortening;
    third and fourth sets of open-ended heating tubes disposed below said selected level in said second tank and extending from one side to the other of said second tank, said third set of tubes being angled upwardly in one direction and terminating in a third set of exhaust ports and the tubes of said fourth set being interposed between pairs of tubes of said tubes third set and angled upwardly in the opposite direction and terminating in a fourth set of exhaust ports;
    a collector extending along one side of said tank and connected on one end with said blower means; and
    third and fourth manifold means enclosing the respective third and fourth sets of exhaust ports and leading to said collector.

5. An immersion deep frier as set forth in claim 4 that includes:
    a fumes duct extending along one side of said tanks and formed with inlets disposed in the upper portion of each of said tanks; and
    means for drawing fumes from said tank.

6. An immersion deep frier as set forth in claim 4 that includes:
    first pipe means connected on its opposite ends with said first tank and second pipe means connected on its opposite ends with said second tank;
    a filter in said pipe means;
    pump means in said pipe means for alternately pumping shortening through said first pipe means and then through said second pipe means.

7. An immersion deep frier as set forth in claim 6 wherein:
    said pump means includes timing means for automatically switching said pump from one tank to the other.

* * * * *

UNITED STATES PATENT OFFICE
CERTIFICATE OF CORRECTION

Patent No. 3,640,208            Dated February 8, 1972

Inventor(s)                    ROBERT A SIZE

It is certified that error appears in the above-identified patent and that said Letters Patent are hereby corrected as shown below:

Column 4, line 22, delete "tubes" (second occurrence).

Signed and sealed this 11th day of July 1972.

(SEAL)
Attest:

EDWARD M. FLETCHER, JR.                  ROBERT GOTTSCHALK
Attesting Officer                         Commissioner of Patents